United States Patent [19]

Ohishi et al.

[11] Patent Number: 4,942,561
[45] Date of Patent: Jul. 17, 1990

[54] DELAY TIME MEASURING DEVICE

[75] Inventors: Masahiro Ohishi; Fumio Ohtomo, both of Tokyo, Japan

[73] Assignee: Kabushikikaisha Topcon, Tokyo, Japan

[21] Appl. No.: 372,630

[22] Filed: Jun. 28, 1989

[30] Foreign Application Priority Data

Jun. 29, 1988 [JP] Japan .............................. 63-161894
Dec. 28, 1988 [JP] Japan .............................. 63-334971

[51] Int. Cl.[5] .......................... G04F 8/00; G01C 3/08
[52] U.S. Cl. ........................................ 368/118; 356/5
[58] Field of Search .................... 368/113, 117–121; 356/5; 343/12–14

[56] References Cited

U.S. PATENT DOCUMENTS

| | | | |
|---|---|---|---|
| 3,037,166 | 5/1962 | Alexander | 368/118 |
| 4,413,904 | 11/1983 | Hamada et al. | 356/5 |
| 4,531,833 | 7/1985 | Ohtomo | 356/5 |
| 4,560,271 | 12/1985 | Fumio | 356/5 |
| 4,615,617 | 10/1986 | Frank et al. | 356/5 |
| 4,620,788 | 11/1986 | Giger | 356/5 |

Primary Examiner—Vit W. Miska
Attorney, Agent, or Firm—Brumbaugh, Graves, Donohue & Raymond

[57] ABSTRACT

A delay time measuring device for measuring a delay time of continuous pulses wherein the averaging effect is improved. The device comprises a rough estimation counter means and a precision measuring means, and the rough estimation counter means makes a rough measurement of a delay time by counting clocks of a reference signal generating means between a starting pulse and a stopping pulse. The precision measuring means performs a precision measurement of a delay time by synchronizing an output signal of a voltage controlled oscillator with the stopping pulse and measuring a difference in phase between the output signal of the voltage controlled oscillator and a signal genrated by the reference signal generating means. Then, a delay time of pulses is measured by synthesizing a rough measured value by the rough estimation counter with the precision measured value.

13 Claims, 4 Drawing Sheets

DELAY TIME MEASURING DEVICE

BACKGROUND OF THE INVENTION

This invention relates to a measuring device for a delay time, and more particularly to a delay time measuring device suitable for use with an optical distance measuring device for measuring a time required for light to be reflected and reciprocate and calculating a distance between a body of the device and an object.

Figure 5:
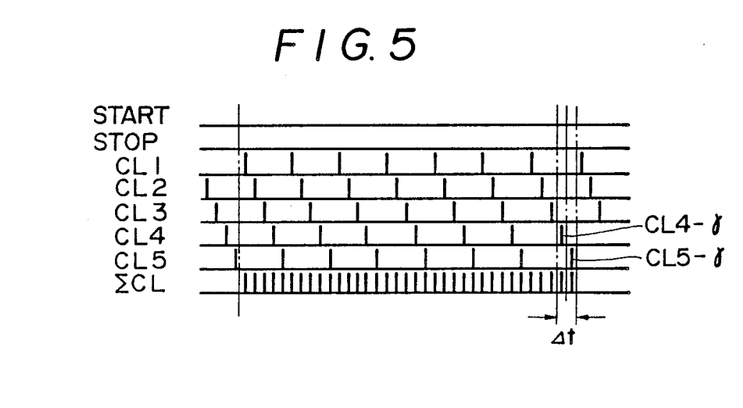
FIG. 5 is a view illustrating the prior art.

A conventional delay time measuring device (device for measuring an interval of time) measures an interval of time between a starting signal and a stopping signal by counting clock signals of a reference signal of a very high frequency comparing with such signals. With the measuring device for an interval of time of such conventional type, if the frequency of the reference signal is raised, then a measurement of time of a high resolution is enabled, but there exists a limitation to the frequency of the reference signal due to restrictions of electric parts and restrictions on circuit construction. Thus, the interval of time between the starting signal and the stopping signal is measured by a plurality if times using a reference signal which is not synchronized with those signals. In particular, if a plurality of starting signals and stopping signals are examined in a fixed condition as shown in FIG. 5, clock signals for each measurement are displaced from each other by an amount corresponding to an out of synchronism amount. Thus, if N times of measurement are performed while counting clock signals CL1 to CL5 between a starting signal and a stopping signal by means of a counter, then the total number $\epsilon$CL is equal to a value of a count when a measurement is performed once with clocks of a frequency of N times the frequency of the clock signals CL1 to CL5. Accordingly, this signifies a rise of resolution by N times.

However, a time interval measuring device of the conventional type is required to repeat a measurement by N times in order to raise its resolution by N times. In particular, this signifies that N times a repeat time of a measurement signal are required for a time for measurement, and if it is intended to measure, for example, an interval of time between a starting signal and a stopping signal having a frequency of 1.5 KHz with a resolutionn of 6,000 times that of the clock signal, then there is a problem that a period of time of $$\frac{6000 * 1}{1.5 \text{ KHz}} = 4 \text{ sec}$$

is required. Further, with a measuring device of the conventional type, the timing of a stopping signal is sometimes varied by a noise produced within the measuring device or an external factor such as an object for measurement, and there is another problem that an averaging effect against such variations cannot be exhibited sufficiently. Particularly where a conventional time interval measuring device is employed for optical measurement of a distance, a stopping signal is produced in response to a beam of light reflected from an object, but such stopping signal is sometimes varied by a noise within the device or by a change in refractive index of air. By the way, if it is assumed that the stopping signal is varied at $\Delta t$ as shown in FIG. 5, the clock signals CL4 and CL5 contribute to such an averaging effect as described above, but the other clock signals CL1 and CL3 do not contribute to the averaging effect. Accordingly, where a stopping signal is being varied, clock signals are divided into those clock signals which contribute to an averaging effect and the other clock signals which do not contribute to an averaging effect, and the clock signals which do not contribute to an averaging effect do not cause any change on $\epsilon$CL. Accordingly, there is a problem that the averaging effect is generally low. Particularly where a pulse laser diode is employed as a light source of an optical distance measuring device, it has a duty ratio of 0.01% or so. Accordingly, there is a problem that an averaging effect cannot be anticipated.

BRIEF DESCRIPTION OF THE DRAWINGS

The drawings show an embodiment of the present invention, and

DESCRIPTION OF THE INVENTION

Figure 1:
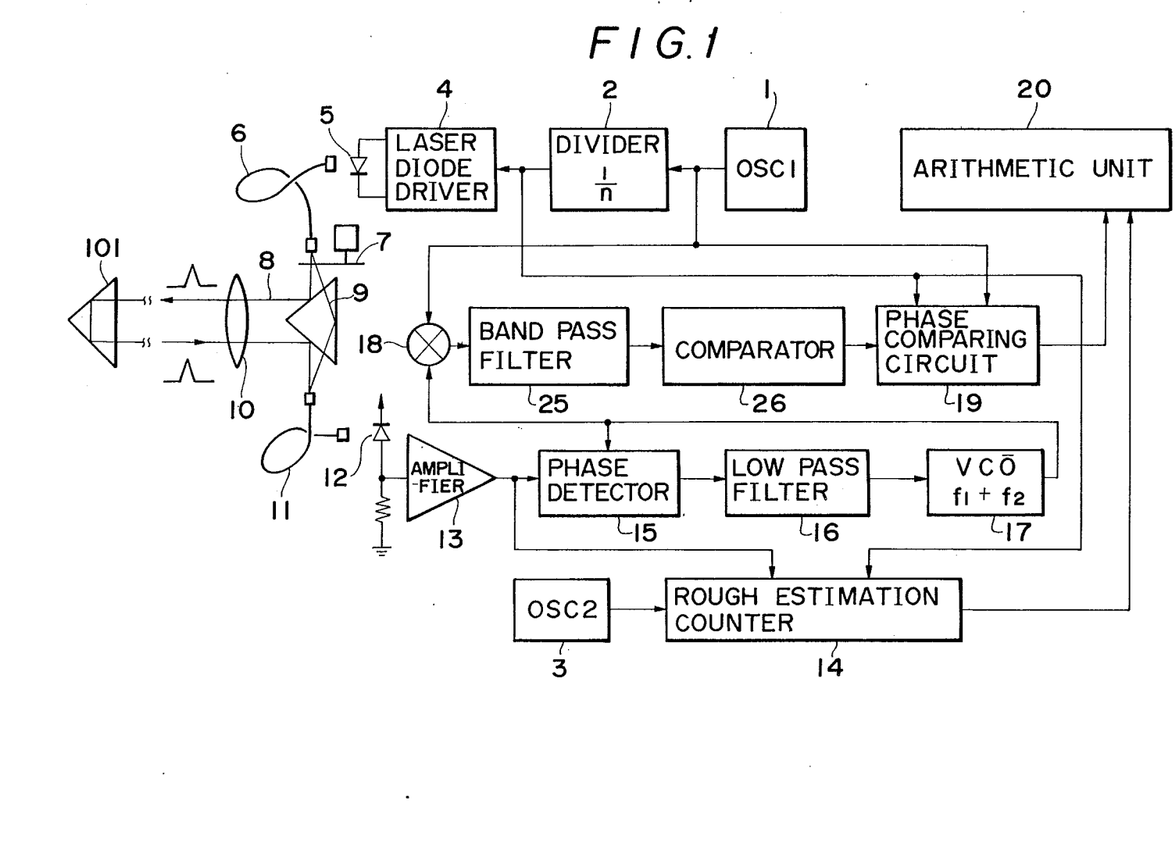
FIG. 1 is a view showing a construction of the present embodiment.

An embodiment of the present invention will be described with reference to the drawings. FIG. 1 shows a construction of an embodiment wherein the present invention is applied to an optical distance measuring device. The optical distance measuring device of the present embodiment is composed of a first crystal oscillator 1, a frequency divider 2, a second crystal oscillator 3, an optical system (5 to 12) a rough estimation counter 14, a phase detecting circuit 15, a low pass filter 16, a voltage controlled oscillator 17, a mixed 18, a band pass filter 25, a comparator 26, a phase comparing circuit 19, an arithmetic unit 20, and so forth. The phase detecting circuit 15, low pass filter 16 and voltage controlled oscillator 17 form a feedback loop. The mixer 18 mixes and detects an output signal of the voltage controlled oscillator 17 and an output signal of the first crystal oscillator 1 to take out a frequency of a difference between them. The phase comparing circuit 19 compares phases of an output signal of the mixer 18 and an output signal of the frequency divider 2 with each other. The band pass filter 25 and comparator 26 are provided to facilitate such comparison in phase. Further, the second crystal oscillator 3 and rough estimation counter constitute a rough estimation counter means for performing a rough measurement.

Subsequently, light paths of the opticaal distance measuring device will be described. The optical system is composed of a laser diode 5, a first optical fiber 6, a light path change-over chopper 7, a distance measuring light path 8, an internal light path 9, an objective 10, a second optical fiber 11, a light receiving element 12, and a corner cube 101. The corner cube 101 is an object installed at a location spaced from a body of the optical distance measuring device and has a function of reflecting a beam of light.

The laser diode 5 is in the form of a pulse laser diode and has a comparatively high peak power so that it can produce a pulse wave having a duty ratio of 0.01 % or so. The light receiving element 12 must only be an element which can receive a beam of pulse light projected from the laser diode 5. The light path change-over chopper 7 is a change-over device for changing over a light path between the distance measuring light path 8 and the internal light path 9.

In the optical system having such a construction as described above, a light pulse emitted from the laser diode 5 is intriduced into the light path change-over chopper 7 passing the first optical fiber 6. If the light path change-over chopper 7 selects the distance measuring light path 8 then, the light pulse is projected from the body via the objective 10. The light pulse thus projected is reflected by the corner cube 101 placed as an object. the light pulse reflected by the corner cube 101 is introduced into the light receiving element 12 via the objective 10 and the second optical fiber 11. These light paths form the distance measuring light path 8 including a distance between the body and the object which makes an object for measurement.

To the contrary, there is another light path by way of which a light pulse emitted from the laser diode 5 passes along the internal light path 9 and is introduced into the light receiving element 12 via the second optical fiber 11. The light path is formed for the object of removing unstablizing factors arising in the inside of the body.

Generally, an optical distance measuring device employs a large number of electronic parts, and since a delay time in such electronic parts is readily influenced by a change in temperature or the like, there is possibility that an unstabilized condition may arise within the body. Thus, by performing measurements for the distance measuring light path 8 and the internal light path 9 and taking a difference between results of such measured values, any unstabilizing factor within the body of the distance measuring device which is included commonly in the two light paths can be removed.

Subsequently, operation of the present embodiment will be described. The first crystal oscillator 1 is oscillating with a frequency f1, and the output signal thereof is forwarded to the frequency divider 2. The frequency divider 2 divides the frequency f1 thus received and delivers a frequency of 1/n of the frequency f1. The output signal of the frequency divider 2 is forwarded to the rough estimation counter 14 and thus serves as a starting signal for the rough estimation counter 14. Further, the output signal of the frequency divider 2 is forwarded to a laser diode driver 4 so that the laser diode driver 4 drives the laser diode 5 to emit light therefrom.

A light pulse emitted from the laser diode 5 passes through the optical system and is projected from the body of the distance measuring device. Then, the thus projected light pulse is reflected by the corner cube 101 as an object and is introduced into the light receiving element 12 within the distance measuring device. The light pulse thus received is converted into an electric signal by the light receiving element 12 and is then amplified by an amplifier 13. An output signal of the amplifier 13 is used as a stopping signal for the rough estimation counter 14. The rough estimation counter 14 normally receives a clock signal from the second crystal oscillator 3 and counts such clocks from the starting signal (output signal of the frequency divider 2) to the stopping signal (output signal of the amplifier 13). The rough estimation counter 14 thus transmits such count data thereof to the arithmetic unit 20. Meanwhile, the output signal (received pulse) of the amplifier 13 is forwarded also to the phase detector 15. An output of the phase detector 15 passes through the low pass filter 16 and is transmitted to the frequency controlling terminal of the voltage controlled oscillator 17. The phase detector 15, low pass filter 16 and voltage controlled oscillator 17 form a feedback loop so that the output signal of the amplifier 13 and the output signal of the voltage controlled oscillator 17 may be synchronized with each other. Here, the oscillattion frequency f1+f2 of the voltage controlled oscillator 17 is selected such that an equation $$f2 = \frac{1}{n} f1$$

may be satisfied. Then, the output signal of the voltage controlled oscillator 17 is transmitted to the mixer 18 at which it is mixed and detected with the oscillation signal f1 of the first crystal oscillator 1, whereafter it is shaped in waveform by the band pass filter 25 and comparator 26 to produce the Frequency f2 which is a frequency equal to the difference between them. Then, the output signal of the comparator 26 is forwarded to the phase comparing circuit 19 by which it is compared in phase with the output signal of the frequency divider 2.

Figure 2:
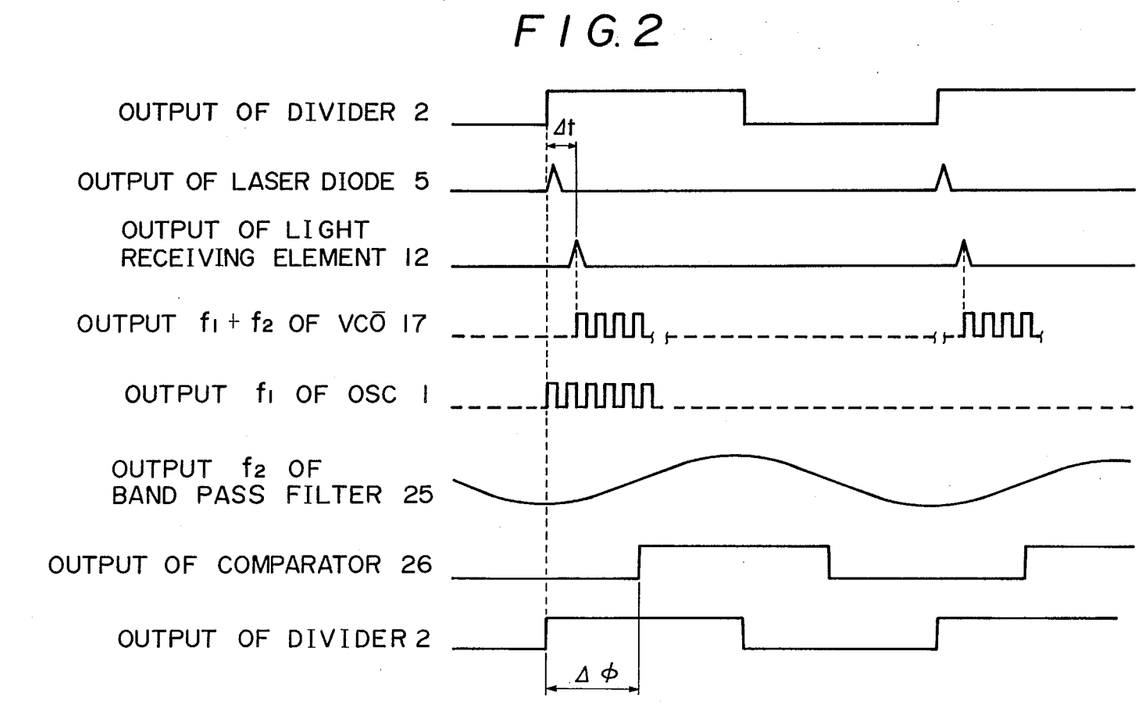
FIG. 2 is a view illustrating a relationship in phase between a reception pulse and and a voltage controlled oscillator, FIG. 3 ois a view illustrating a phase detector.

Here, a relationship between transmission and reception pules and a phase relationship between the outputs of the comparator 26 and the frequency divider 2 will be describde with reference to FIG. 2. At first, it is assumed that the distance measuring light path 8 is selected by the light path change-over chopper 7. If a time from a rising edge of the output of the frequency divider 2 to emission of light by the laser diode 5 and a time required for a light pulse to be reflected and return from the corner cube 101 are represented by $\Delta t$, then a reception pulse appears at the output of the light receiving element 12 after lapse of time by $\Delta t$ from the rising edge of the output of the frequency divider 2. The voltage controlled oscillator 17 is synhronized with the reception pulse so that the phase relationship between the output of the voltage controlled oscillator 17 and the output of the light receiving element 12 will be such as shown in FIG. 2. If $\Delta t$ is represented with the output frequency (f1+f2) of the voltage controlled oscillattor 17, then $$\Delta t = \frac{k}{(f1+f2)} + \frac{\Delta \phi}{2\pi} \cdot \frac{1}{(f1+f2)}$$

is obtained. Here, k is an integer. Meanwhile, $\Delta \phi$ is $$0 \leq \Delta \phi < 2\pi$$

and is a representation of a fraction of time shorter than one period of 1/ (f1+f2) by a phase amount where 1/(f1+f2) is taken as one period.

Then, the output of the voltage controlled oscillator 17 is mixed and detected with the frequency f1 of the first crystal oscillator 1 by the mixer 18 and then passes through the band pass filter 25 to make a frequency f2. The output of the band pass filter 25 is converted into a square wave by the comparator 26 so as to facilitate a phase comparison with the output of the frequency divider 2. Here, the difference in phase between the output of the frequency divider 2 and the output of the comparator 26 to be compared in phase by the phase comparing circuit 19 is equal to $\Delta \phi$ of the equation above.

Accordingly, in order to measure $\Delta t$, k and $\Delta \phi$ of the equation above should be detected.

For example, where f1=15 MHz and n=5,000, f2 is given by $$f2 = 15 \text{ MHz} * \frac{1}{5,000}$$
$$= 3 \text{ KHz}$$

and the oscillation frequency f1+f2 of the voltage controlled oscillator 17 ois given by $$f1+f2=15.003 \text{ MHz}$$

In this instance $\Delta\phi$ is expanded to $$\frac{15.003 \text{ MHz}}{3 \text{ KHz}} = 5.001 \text{ times}$$

The thus expanded value $\Delta\phi$ is digitized with a number of clocks of the first crystal oscillator by the phase comparing circuit 19 and is then forwarded to the arithmetic unit 20.

Meanwhile, k is given as a rough measured value by the rough estimation counter 14 and forwarded to the arithmetic unit 20.

The arithmetic unit 20 synthesizes a rough measured value by the rough estimation counter 14 and a precision measured value obtained by the phase comparing circuit 19 and calculates a delay time to be found out. Here, the rough estimation counter 14 is counting a clock signal of the second crystal oscillator 3. Accordingly, it is not synchronized with clocks of the first crystal oscillator 1. Therefore, neither of emission of light from the laser diode 5 and reception pulses as well as starting and stopping signals is synchronized with the second crystal oscillator. Accordingly, the error in quantization caused by clocks of the second crystal oscillator 3 is reduced, and by averaging a plurality of measurements, a period which is londer than the period of the second crystal oscillator 3 can be measured to a value smaller than one clock.

To the contrary, a precision measurement cannot measure a period which is longer than the period of the first crystal oscillator 1. Thus, the arithmetic unit compares a value of a rough measurement smaller than one clock with a value of the highest order of a precision measured value and adjusts and adds the rough measured value to the precision measured value to calculate a measured value to be found out. The measurement for the distance measuring light path 8 is thus completed. Subsequently, the internal light path 9 is selected by the light path change-over chopper 7, and after then, a rough measured value $k_i$ and a phase difference $\Delta\phi_i$ corresponding to a time $\Delta t_i$ from a rising edge of an output of the frequency divider 2 and a reception pulse which is an output of the light receiving element 12 are calculated in a similar manner as in the distance measuring light path 8 is selected. Further, a distance to the corner cube can be found out by subtracting the rough measured value $k_i$ and the phase difference $\Delta\phi_i$ for the internal light path from the rough measured value k and the phase difference $\Delta\phi$ for the distance measuring light path 8. The present embodiment having such a construction as described above has effects that it can eliminate an instability in the inside of the distance measuring device arising from an interval of time until the laser diode 5 is caused to emit light after a rising edge of an output of the frequency divider 2, a drift of the electric circuit and so on, and that a distance can be measured accurately.

Figure 3:
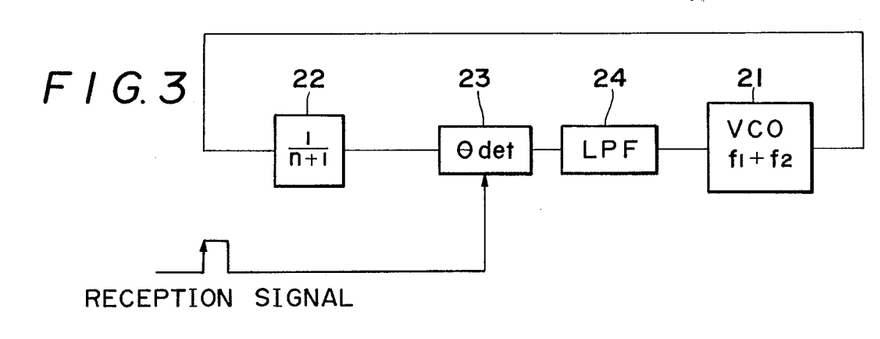

Subsequently, a concrete embodiment of a phase detection will be described with reference to FIG. 3. The embodiment is composed of a voltage controlled oscillator 21, a frequency divider 22, a phase comparing circuit 23 and a low pass filter 24 which make a common PLL (phased locked loop).

An output signal of the voltage controlled oscillator 21 is divided to 1/(n+1) by the frequency divider 22 and compared in phase with reception signal by the phase comparing circuit 23. An output signal of the phase comparing circuit 23 passes through the low pass filter 24 and is received by a controlling terminal of the voltage controlled oscillator 21 so that a feedback loop is formed. When the circuit operates, the output signal of the frequency divider 22 is synchronized with the reception signal. It is to be noted that, if the variable frequency range $\Delta f$ of the voltage controlled oscillator 21 is too wide, for example, if the output frequency of the mixer 18 is 3 KHz, then two frquencies of $$, 15MHz-3KHz=14.997MHz$$
$$, 15MHz-3KHz=15.003MHz$$

obtained, and accordingly, it is necessary to provide a limitation to some degree so as to establish a relationship $$\Delta f < f2$$

Figure 4A:
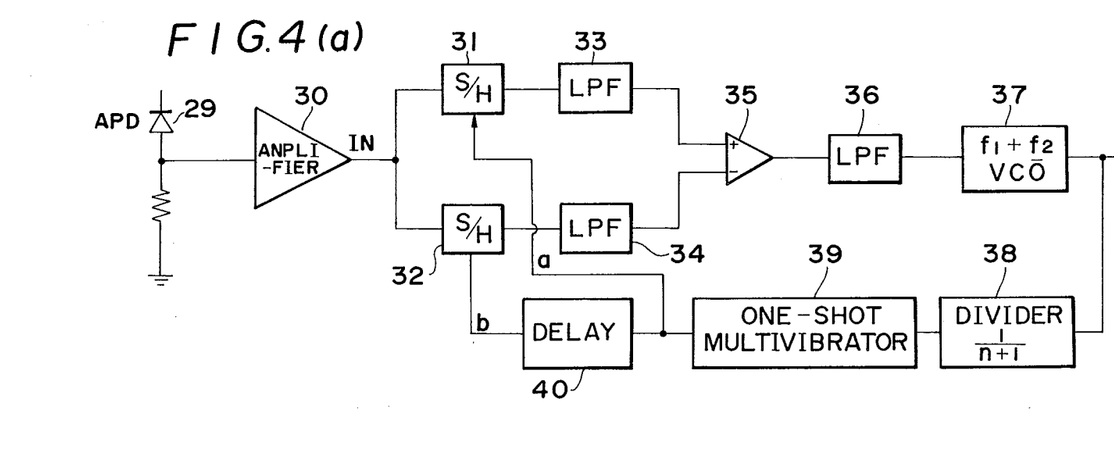
FIG. 4 is a view illustrating a modification to present embodiment.
Figure 4B:
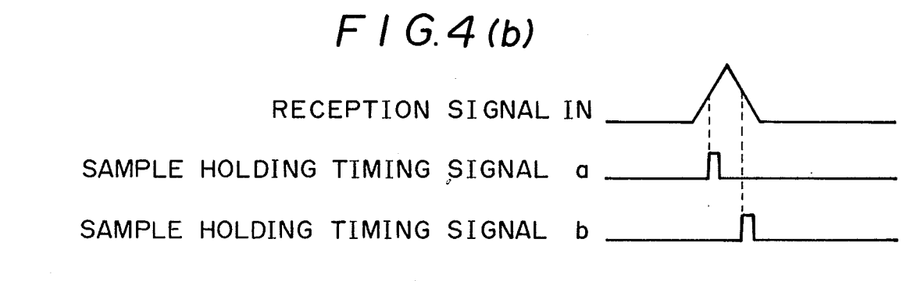

It is to be noted that another modification will be described with reference to FIG. 4. The present embodiment is intended, perceiving that a light pulse emitted from the laser diode 5 is a substantially chopping wave, to perform detection of a center position of a reception signal at the same time. The present embodiment is composed, as shown in FIG. 4 (a), of a pair of sample holding circuits 31 and 32, three low pass filters 33, 34 and 36, a voltage controlled oscillator 37, a frequency divider 38, a one-shot multivibrator 39, a delay circuit 40 and so forth. A light pulse received by the light receiving element 29 is amplified by an amplifier 30 and delivered to the sample holding circuits 31 and 32. It is to be noted that the sample holding circuits 31 and 32 perform a sample holding operation at timings of clocks from the voltage controlled oscillator 37 which are divided by the frequency divider 38. In this instance, the delay circuit 40 is interposed in the sample holding circuit 32 so that the sample holding circuit 32 may perform a sample holding operation at a timing delayed from the sample holding circuit 1. Then, a signal thus held passes through the low pass filters 33 and 34 and is then amplified by a differential amplifier 35. The thus held signal then passes through the low pass filter 36 and is thereafter transmitted to the controlling terminal of the voltage controlled oscillator 37. The feedback loop operates such that the reception signal and the sample holding timing pulses may have such a phase relationship as shown in FIG. 4 (b). Accordingly, the present embodiment has an effect that not only it outputs a signal synchronized with the reception signal (f1+f2) but also it can perform a detection of a center position of the reception pulse at the same time.

The present embodiment having such a construction as described above is most suitable for an optical distance measuring device because a delay time of continuous pulses can be measured precisely. Particularly because a phase measurement is performed after conversion to a lower frequency by mixing detection, there is an effect that also an averaging effect can be anticipated and a measurement of a distance can be attained with a high degree of accuracy. The present invention can be applied, without being limited to an optical distance measuring device, also to a time measuring device, a distance measuring device, a velocity measuring device and so forth.

The present invention has been made in view of such problems as described above, and a delay time measuring device for measuring a delay time of continous pulses is characterized in that it comprises a rough estimation counter means and a precision measuring means, and that the rough estimation counter means has a construction for counting clocks of a reference signal generating means between a starting pulse and a stopping pulse while the precision measuring means includes a voltage controlled oscillator and means for synchronizing an output signal of the voltage controlled oscillator with the stopping pulse, and the precision measuring means is consituted so as to measure phases of an output signal of the voltage controlled oscillator synchronized with the stopping pulse and a signal generated by the reference signal generating means to effect a precision measurement of a delay time, wherein a delay time is measured from a result of measurement of the rough estimation counter and another result of measurement of the precision measuring means.

The delay time measuring device of the present invention having such a construction as described above comprises the rough estimation counter means and the precision measuring means, and the rough estimation counter means can make a rough measurement of a delay time by counting clocks of the reference signal generating means between a starting pulse and a stopping pulse. Further, the precision measuring means can perform a precision measurement of a delay time by synchronizing an output signal from the control signal generating means with the stopping pulse and measuring a phase difference of the output signal of the control signal generating means thus synchronized with the stopping pulse from a signal generated by the signal generating means. Then, a delay time of pulses can be measured by synthesizing a rough measured value by the rough estimation counter with the precision measured value.

The present invention having such a construction as described above has a construction wherein it comprises a rough estimation counter means and a precision measuring means and the rough estimation counter means counts clocks of a reference signal to perform a rough measurement while the precision measuring means synchronizes an output of a voltage controlled oscillator with a stopping pulse and detects a difference in phase between the output signal of the voltage controlled oscillator thus synchronized with the stopping pulse and the reference signal. Accordingly, there is an effect that a measurement of a delay time can be attained with a high degree of accuracy without raising the frequency of the reference signal. Further, since a measured value by a rough measurement and another measured value by a precision measurement are synthesized, there is another effect that even a period greater than a period of the reference signal can be measured accurately.

What is claimed is:

1. A delay time measuring device comprising:
   first reference signal means for supplying a first reference signal having a prescribed frequency;
   second reference signal means for supplying a second reference signal synchronized with said first reference signal and having a lower frequency than that of said first reeference signal;
   light emission means, coupled to said second reference signal means, for emitting a pulse of light toward a measuring piont in response to said second reference signal;
   light reception means for receiving a reflected light signal from the measuring point;
   first measuring signal means, coupled to said light reception means, for generating a first measuring signal sychronized with said reflected light signal and having a frequency equal to the frequency of said first reference signal plus the frequency of said second reference signal;
   second measuring signal means, coupled to said first refference signal means and said first measuring signal means, for mixing said first reference signal and said first measuring signal and forming a second measuring signal representative of the difference in frequency between said signals; and
   phase difference detection means, coupled to said second reference signal means and said second measuring signal means, for developing a precision time delay representative signal based on the phase difference between said second reference signal and said second measuring signal.

2. The delay time measuring device of claim 1 further comprising counter means coupled to said second reference signal means and said light reception means, for providing a rough estimation count signal representative of an integral number of clock pulses, having a period corresponding to said first reference signal, occuring between emission of a pulse of light and receipt of a reflected pulse of light.

3. The delay time measuring device of claim 2 further comprising arithmetic means, coupled to said counter means and said phase difference detection means, for calculating the light delay time by utilizing said rough estimation count signal and said precision time delay representative signal.

4. the delay time measuring device of claim 3 further comprising:
   an internal light path for guiding light pulses from said light emission means directly towards said light reception means and
   chopper means disposed to selectively direct light pulses from said light emission means towards said internal light path;
whereby calibration measurement of internal delays of said device can be determined by the difference between the phase difference in the distance measuring path and the phase difference in the internal light path.

5. The delay time meauring device of claim 4 in which said first measuring signal means comprises a feed back loop comprising a phase detecto, low pass filter, and voltage controlled oscillator of frequency equal to said first reference signal frequency plus said second reference signal frequency; said feedback loop being arranged so that said first measuring becomes synchronized with said reflected light signal after a plurality of electric light signals have been detected.

6. The delay time measuring device of claim 5 in which said second reference signal means is a frequency divider circuit for providing a second reference signal whose frequency is an integral fraction of said first reference signal.

7. The delay time measuring device of claim 6 in which said light emission means is a laser diode driver.

8. A delay time measuring device for determining the lenght of an external light path between said device and a pulse reflecting object, said device ccomprising:
  means for generating a first reference signal having a first frequency f1;
  means for generating a second reference signal synchronized with said first reference signal and having a second frequency f2 which is lower than said first frequency f1;
  light emission means for emitting pulses of light along an external light path towards a reflecting object in response to said second reference signal;
  light reception means for receiving pulses of light from said reflecting object and generating an electric pulse representative thereof;
  means for providing a rough estimation count signal representative of an integral number of clock pulses, having a period corrseponding to said first reference signal, occurring between emission of a light pulse and receipt of a reflected light pulse;
  synchronization means for providing a first measuring signal synchronized with said electric pulse and at a frequency (f1+f2);
  mixing means for converting said first measuring signal to a second measuring signal at a fequency f2;
  means for comparing the phase of said second measuring signal at frequency f2 with the phase of said second reference signal at freqiency f2, and generating a precision time delay representative signal; and
  arithmetic means for calculating the pulse delay time by utilizing said third measuring signal and said rough estimation count signal.

9. The delay time measuring device of claim 8 further comprising:
  an internal light path for guiding light pulses from said light pulse emission means directly towards said light pulse reception means and
  chopper means disposed at said light pulse emission means to selectively direct light pulses towards said internal light path or towards said external light path; whereby calibration measurement of internal delays of said device can be determined and accounted for.

10. A method of measuring a delay time comprising the steps of:
  supplying a first referrence signal having a prescribed frequency;
  supplying a second reference signal synchronized with said first reference signal and having a lower frequency than that of said first reference signal;
  emitting pulses of light towards a measuring point in response to said second reference signal;
  receiving light pulses reflected from the measuring point;
  synchronizing a first measuring signal with said received light pulses, said first measuring signal having a frequency equal to the frequency of said first reference signal plus the frequency of said second reference signal;
  forming a second measuring signal representative of the difference in frequency between said first reference signal and said first measuring signal by mixing said first reference signal with said first measuring signal; and
  developing a precision time delay representative signal by detecting the difference in phase between said second reference signal and said second measuring signal.

11. The method of measuring a time delay as in claim 10 further comprising the step of deriving a rough estimation count signal representativer of an integral number of clock pulses, having a period corrseponding to said first reference signal, occurring between emission of a pulse of light and receipt of a reflected pulse of light.

12. The method of measuring a time delay as in claim 11 further comprising the step of calculating the light pulse delay time by utilizing said rough estimation signal and said precision time delay representative signal.

13. The method of measuring a time delay as in claim 12 further comprising the step of selectively directing light pulses towards an internal light path whereby calibration measurement of internal delays can be determined and accounted for.

* * * * *

UNITED STATES PATENT AND TRADEMARK OFFICE
CERTIFICATE OF CORRECTION

PATENT NO. : 4,942,561

DATED : July 17, 1990

INVENTOR(S) : Ohishi et al.

It is certified that error appears in the above-identified patent and that said Letters Patent is hereby corrected as shown below:

Title page, Item 73, "Kabushikikaisha" should read --Kabushiki Kaisha--;

First page, 5th from bottom line of ABSTRACT, "genrated" should read --generated--;

Column 1, line 68, "CL1 and CL3" should read --CL1 to CL3--;

Column 2, line 22, "ois" should read --is--;

Column 2, line 23, "to present" should read --to the present--;

Column 2, line 38, "mixed" should read --mixer--;

Column 3, line 7, "intriduced" should read --introduced--;

Column 3, line 13, "the" (1st occurrence) should read --The--;

Column 4, line 19, "Frequency" should read --frequency--;

Column 4, line 25, "pules" should read --pulses--;

UNITED STATES PATENT AND TRADEMARK OFFICE
CERTIFICATE OF CORRECTION

PATENT NO. : 4,942,561

DATED : July 17, 1990

INVENTOR(S) : Ohishi et al.

It is certified that error appears in the above-identified patent and that said Letters Patent is hereby corrected as shown below:

Column 4, line 27, "describde" should read --described--;

Column 4, line 42, "oscillattor" should read --oscillator--;

Column 5, line 10, "ois" should read --is--;

Column 5, line 39, "londer" should read --longer--;

Column 6, line 25, "15MHz-3KHz" should read --15 MHz + 3 KHz--;

Column 6, line 27, "obtained" should read --are obtained--;

Column 8, line 7, "reeference" should read --reference--;

Column 8, line 43, "light" should read --light pulse--;

Column 8, line 46, "the" should read --The--;

Column 8, line 60, "feed back loop comprising a phase detecto," should read --feedback loop comprising a phase detector--.

Signed and Sealed this

Nineteenth Day of May, 1992

Attest:

DOUGLAS B. COMER

Attesting Officer

Acting Commissioner of Patents and Trademarks